(12) United States Patent
Prakash et al.

(10) Patent No.: US 7,613,815 B1
(45) Date of Patent: Nov. 3, 2009

(54) METHOD AND APPARATUS FOR CUSTOMIZED LOGGING IN A NETWORK CACHE

(75) Inventors: Ashish Prakash, Morrisville, NC (US); Robert M. English, Menlo Park, CA (US)

(73) Assignee: NETAPP, Inc., Sunnyvale, CA (US)

( * ) Notice: Subject to any disclaimer, the term of this patent is extended or adjusted under 35 U.S.C. 154(b) by 756 days.

(21) Appl. No.: 09/982,243

(22) Filed: Oct. 16, 2001

Related U.S. Application Data (63) Continuation-in-part of application No. 09/978,968, filed on Oct. 15, 2001.

(51) Int. Cl.
G06F 7/00 (2006.01)
G06F 15/16 (2006.01)
G06F 3/00 (2006.01)

(52) U.S. Cl. .......................... 709/230; 707/100; 710/11

(58) Field of Classification Search ................. 709/203, 709/231
See application file for complete search history.

(56) References Cited

U.S. PATENT DOCUMENTS

| | | | |
|---|---|---|---|
| 5,375,199 A | | 12/1994 | Harrow et al. |
| 5,612,898 A | * | 3/1997 | Huckins ..................... 709/224 |
| 5,662,898 A | | 9/1997 | Ligon et al. |
| 5,787,253 A | * | 7/1998 | McCreery et al. ........... 709/231 |
| 5,974,457 A | | 10/1999 | Waclawsky et al. |
| 5,983,270 A | * | 11/1999 | Abraham et al. ............ 709/224 |
| 5,983,274 A | * | 11/1999 | Hyder et al. ................ 709/230 |
| 6,148,338 A | | 11/2000 | Lachelt et al. |
| 6,553,416 B1 | | 4/2003 | Chari et al. |
| 6,598,090 B2 | | 7/2003 | Champlin |
| 6,760,420 B2 | * | 7/2004 | Heilmann et al. ........... 379/189 |
| 2002/0087949 A1 | * | 7/2002 | Golender et al. ............ 717/124 |

FOREIGN PATENT DOCUMENTS

| | | | |
|---|---|---|---|
| WO | WO 00/47003 | * | 8/2000 |

OTHER PUBLICATIONS

Eckstein, Robert, et. al. Java Swing. O'Reilly. Sep. 1998.*
Zinky, John and Krishnaswamy, Vijaykumar, "PASS—A Service for Efficient Large Scale Dissemination of Time Varying Data Using Corba," Jun. 1999, IEEE, pp. 496-506.*
Shu, LihChyun et al, "Shadowing-based Crash Recovery Schemes for Real-Time Database Systems," Jun. 1999, IEEE, pp. 260-267.*

(Continued)

*Primary Examiner*—Vivek Srivastava
*Assistant Examiner*—Azizul Choudhury
(74) *Attorney, Agent, or Firm*—Perkins Coie LLP (57) ABSTRACT

Custom logging allows users deploying a proxy cache to customize information logged by the proxy cache. Users may choose to log a certain set of fields in any suitable order within log files. Each log file contains headers that define the set of fields logged, thereby making the log file self-contained for analysis tools. Proxy cache customers use log files for several purposes including monitoring and billing. The invention provides a single structure that controls whether a field is selected for logging or not, and its position within the log file. Changes to the format can be made while the proxy cache is running, causing a new header to be written to the log file and enabling administrators to alter the log format on the fly.

19 Claims, 7 Drawing Sheets

OTHER PUBLICATIONS

Rao, Sriram et al. "The Cost of Recovery in Message Logging Protocols," Apr. 2000, IEEE, Vol. 12, No. 2, pp. 160-173.*

Kongmunvattana, Angkul and Tzeng, Nian-Feng, "Lazy Logging and Prefetch-Based Crash Recovery in Software Distributed Shared Memory Systems," Apr. 1999, IEEE, pp. 399-406.*

Hallam-Baker et al. "Extended Log File Format," World Wide Web Consortium (W3C) Working Draft WD-logfile-960323, pp. 1-6, downloaded from http://www.w3.org/TR/WD-logfile.html Oct. 10, 2001.

* cited by examiner

Setting up Logging through User Interface

METHOD AND APPARATUS FOR CUSTOMIZED LOGGING IN A NETWORK CACHE

This is a continuation-in-part of co-pending U.S. patent application Ser. No. 09/978,968, filed on Oct. 15, 2001, and entitled, "Method and Apparatus for Customized Logging in a Network Cache."

FIELD OF THE INVENTION

The present invention pertains to devices which proxy requests between clients and servers on a computer network. More particularly, the present invention relates to a method and apparatus for customized logging in a network cache.

BACKGROUND OF THE INVENTION

Of the many uses of the Internet, one of the more common ones is to access content on a remote server, such as a World Wide Web server. Typically, a person operates a client device to access content on a remote origin server over the Internet. The client may be, for example, a personal computer (PC) or a handheld device such as a personal digital assistant (PDA) or cellular telephone. The client often includes a software application known as a browser, which can provide this functionality. A person using the client typically operates the browser to locate and select content stored on the origin server, such as a web page or a multimedia file. In response to this user input, the browser sends a request for the content over the Internet to the origin server on which the content manner (e.g., it displays the web page or plays the audio file). The request and response may be communicated using well-known protocols, such as transmission control protocol/Internet protocol (TCP/IP) and hypertext transfer protocol (HTTP).

For a variety of reasons, it may be desirable to place a device known as a proxy logically between the client and the origin server. For example, organizations often use a proxy to provide a barrier between clients on their local area networks (LANs) and external sites on the Internet by presenting only a single network address to the external sites for all clients. A proxy normally forwards requests it receives from clients to the applicable origin server and forwards responses it receives from origin servers to the appropriate client. A proxy may provide authentication, authorization and/or accounting (AAA) operations to allow the organization to control and monitor clients' access to content. A proxy may also act as (or facilitate the use of) a firewall to prevent unauthorized access to clients by parties outside the LAN. Proxies are often used in this manner by corporations when, for example, a corporation wishes to control and restrict access by its employees to content on the Internet and to restrict access by outsiders to its internal corporate network. This mode of using a proxy is sometimes called "forward proxying".

It is also common for a proxy to operate as a cache of content that resides on origin servers; such a device may be referred to as a "proxy cache". An example of such a device is the NetCache product designed and manufactured by Network Appliance, Inc. of Sunnyvale, Calif. The main purpose of caching content is to reduce the latency associated with servicing content requests. By caching certain content locally, the proxy cache avoids the necessity of having to forward every content request over the network to the corresponding origin server and having to wait for a response. Instead, if the proxy cache receives a request for content which it has cached, it simply provides the requested content to the requesting client (subject to any required authentication and/or authorization) without involving the origin server.

Proxy caches may be used by corporations and other institutions in the forward proxying mode, as described above. Proxy caches are also commonly used by high-volume content providers to facilitate distribution of content from their origin servers to users in different countries or other geographic regions. This scenario is sometimes called "reverse proxying". As an example of reverse proxying, a content provider may maintain proxy caches in various different countries to speed up access to its content by users in those countries and to allow users in different countries to receive content in their native languages. In that scenario the content provider "pushes" content from its origin servers to its proxy caches, from which content is provided to clients upon request.

Customization of log files for a proxy cache allows administrators to define, collect, and process the information that is most useful in understanding typical web traffic patterns and anomalies. This information may also be used for billing purposes for users of the proxy cache.

Previous implementations provided a fixed set of pre-defined log file formats that were inflexible because the user did not have the choice to include or exclude a particular field from the log format. The user did not have the ability to create new fields for which to log information. The user also did not have the ability to specify the order of a particular field in a log file. What is needed, therefore, is a technique which overcomes these disadvantages of the prior art.

SUMMARY OF THE INVENTION

The present invention includes a method and apparatus for logging customized information in a network cache. The method comprises providing a user interface to allow a user to select a subset of a plurality of fields that may be present in a request for content from a client. The subset includes some or all of the fields and each field within the subset is printed to a log file in the sequence specified by the user.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for customized logging in a network cache are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

As described in greater detail below, customized logging allows an administrator deploying a network cache to tailor information logged by the network cache. Information to be logged includes fields that are found in requests from clients and responses from servers. These fields are validated for correctness and the appropriate log control structures are initialized. The present invention uses a log control structure for each protocol to track fields to be logged and their relative positions in the log file. The following protocols may be supported by a proxy cache which uses this technique, for example: web access, streaming, streaming details, internet content adaptation protocol (ICAP), ICAP debug, network news transfer protocol (NNTP), and global request manager (GRM). Each protocol has its own control structure, such that the log format for each protocol can be independently altered and customized at run-time. More specifically, the invention provides, for each protocol, a data structure that indicates whether or not each field in the protocol is to be logged and, if so, the order of that field within the log file. Changes to the log format can be made while the proxy cache is running, causing a new header to be written to the log file, thereby enabling administrators to alter the format on the fly. The algorithm for defining a log format determines whether all fields are valid and sets positional integers in the control structure when a new format is specified. As a transaction is processed, fields are checked to see if they should be logged by examining the control structure, and field data is stored in memory with relevant position and length information for each field. At the end of a transaction, every field that was selected is written to the log file in the correct order using the stored position and length information.

Note that the present invention can be used to provide customized logging of fields in either request from clients or responses from origin servers. To simplify description, however, the following description sometimes focuses on logging requests.

The framework allows for the addition of new fields and is easily maintainable using macros for field definitions and automatic generation of control structures and field literals. In order to detail the ability to add new fields, the operation of logging HTTP request and response headers will be explored in further detail. There are HTTP headers (as defined by the Request for Comments (RFC) standard) that the application module of the proxy cache parses as part of its normal operation (i.e., looking for cacheability information, dates and times, etc.) and there are other headers including any proprietary headers that web servers and browsers may use. These headers will be referred to as "parsed" headers and "other" headers, respectively. A log format can include fields that represent both request and response headers. When an administrator enters a custom log format using the user interface of the proxy cache, the application module parses that log format to validate it and set up the log control structure (the structure that determines which fields are logged and their positions). This structure contains non-header fields. When the application module encounters a header field, it first determines whether it is a request or a response header. Then it determines whether it is a parsed header by searching through header parse tables, and if it is a parsed header it sets the positional field in a field in the parse table. If this is not a parsed header then the header and position is stored in a separate 'other headers' array.

Hence, in one embodiment header log positional information is stored in four different tables: 1) a table for parsed request headers, 2) a table for parsed response headers, 3) a table for 'other' request headers, and 4) a table for 'other' response headers. For parsed headers, logging information is stored in the appropriate parse table (request or response) and for other headers there are two separate arrays for other request headers and other response headers. When the HTTP code is processing a request or a response and parsing headers it checks the parse tables and processes each header according to the parse table and also makes a call to the log module. If there is no flag present, that header is copied into the temporary log buffer and the appropriate position is noted. If this is another header and does not have an entry in the parse tables, the 'other headers' array is checked to see if there is a match. If there is a match, that header is logged.

As will become more apparent from the description which follows, the described technique allows network administrators to use log files for a variety of purposes, including monitoring and billing. Previous implementations allowed little control over choosing information written to log files, with only a few sets of pre-defined log file formats. Furthermore, allowing customization of the information being logged for each log file gives the user (e.g., administrator) control over exactly what data they can include in specific log files. In addition, the customized logging technique described herein complies with the WC3 standard, Hallam-Baker et al., "Extended Log File Format", World Wide Web Consortium (W3C) working draft WD-logfile-960323, which facilitates the use of log analysis software that conforms to that standard.

Another significant advantage of the proxy cache described herein is that the module which maintains knowledge of the various fields for each protocol (the "application module") is separate from, and independent of, the module which actually records the user-selected fields during a transaction (the "logging module"). Consequently, new fields can be added and new protocols can be supported without any changes being required to the logging module.

Figure 1:
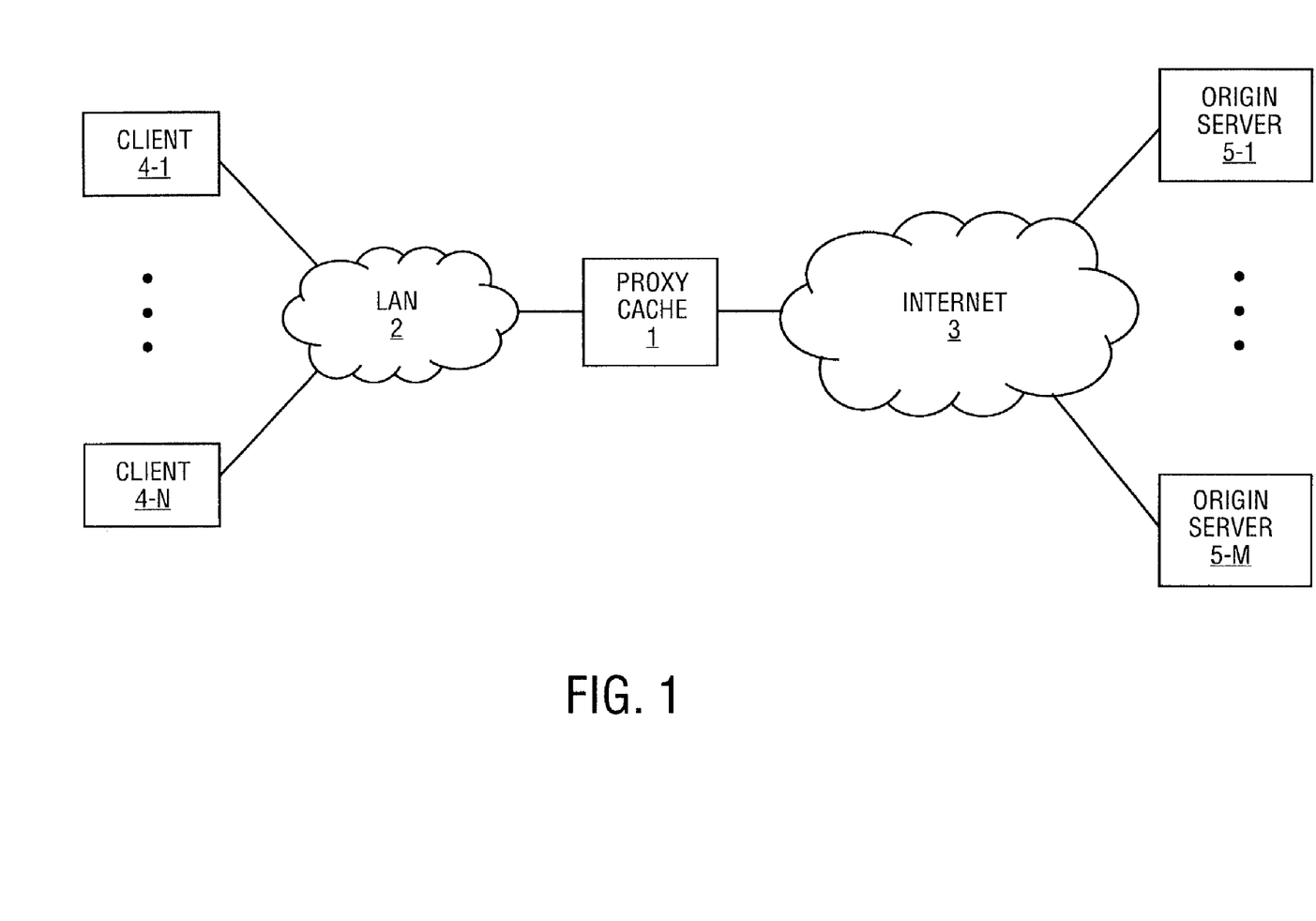
FIG. 1 illustrates a network environment in which a proxy cache according to the present invention may be implemented.

FIG. 1 illustrates a network environment in which a proxy cache according to the present invention may be implemented. As illustrated, a proxy cache 1 configured according to the present invention is connected between a LAN 2 and the Internet 3. A number (N) of clients 4-1 through 4-N are coupled to the LAN 2. A number (M) of origin servers 5-1 through 5-M are coupled to the Internet 3. The proxy cache 1 forwards requests from the clients 4 for content residing on the origin servers 5 and forwards content and/or other responses from the origin servers 5 to the appropriate clients 4. The proxy cache 1 also caches content from the origin servers 5. It may be assumed that the proxy cache 1 operates within a defined cache hierarchy.

Note that a proxy cache in accordance with the present invention can be used advantageously in network environments other than that shown in FIG. 1. For example, a proxy cache according to present invention need not be used to couple clients on a LAN to the Internet. In other embodiments, one or more other types of networks may be substituted for either the LAN 2 or the Internet 3 in the configuration of FIG. 1. Furthermore, a proxy cache may be used in either a forward proxying configuration or a reverse proxying configuration consistently with the present invention.

Figure 2:
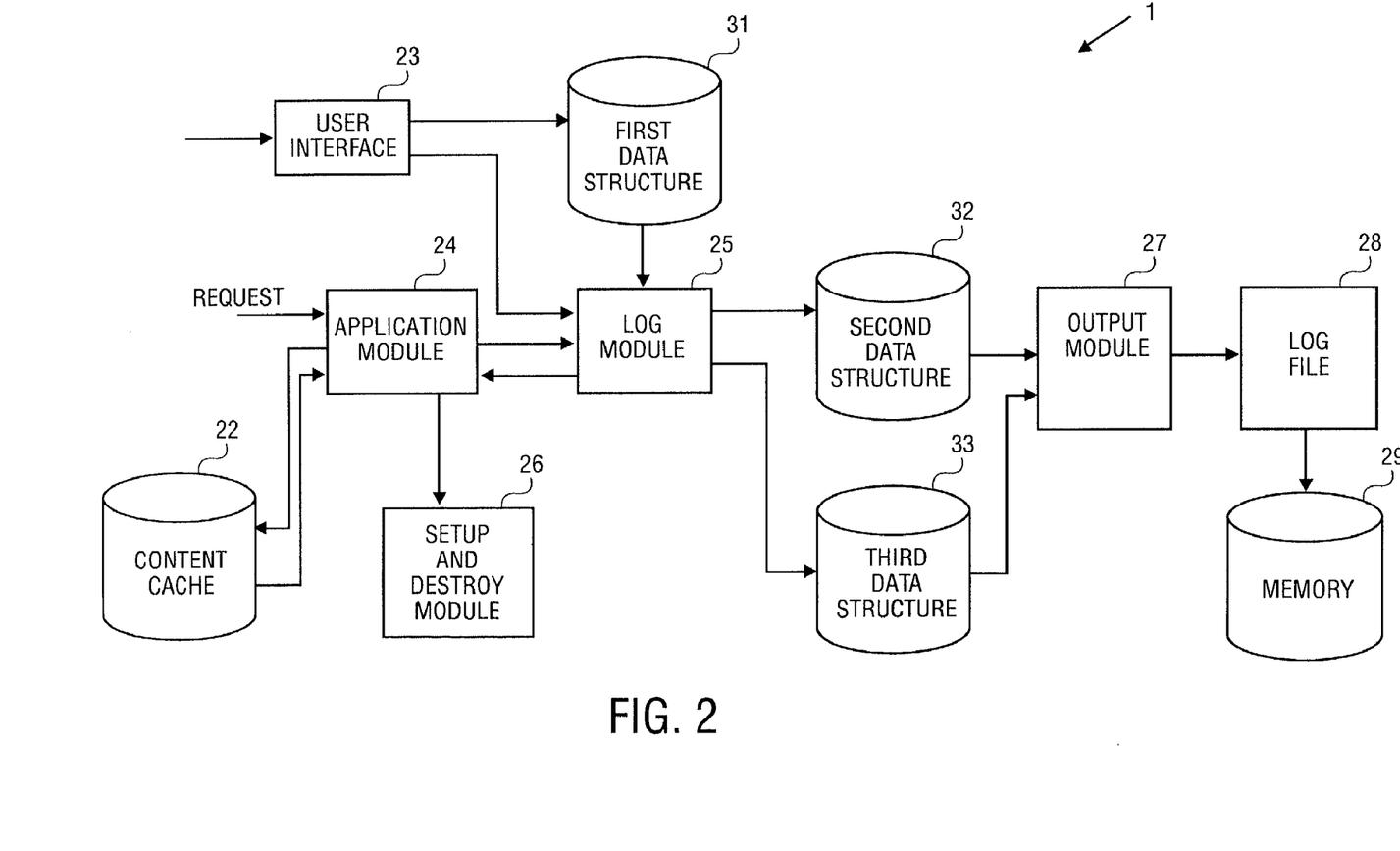
FIG. 2 illustrates an implementation of a logging system according to one embodiment.

FIG. 2 illustrates an example of the elements of the proxy cache 1, according to one embodiment. The proxy cache 1 includes an application module 24 that receives requests for content on the network from a plurality of clients 4, receives corresponding responses from origin servers 5 (when requested content is not cached locally), and stores content (e.g., web pages or multimedia files) obtained for each client in a content cache 22. The application module 24 may be, for example, layer 7 software (with respect to the ISO/OSI model). These requests for content on the network and responses from origin servers each generally contain multiple fields that may be logged by the proxy cache 1. An administrator ("user") utilizes a user interface 23 to choose fields to be logged and the particular order in which the chosen fields are to be logged. A first data structure 31 in the proxy cache 1 is used to store indications of which fields the user has selected for logging and the order in which the user wants the chosen fields to appear in a log file.

Subsequently, in response to receiving a content request from a client or a response from a server, the application module 24 invokes a setup operation of setup and destroy module 26 in the proxy cache 1 to create a second data structure 32 and a third data structures 33, which are temporary data structures that will be used to record the information that is to be logged. The application module 24 calls the log module 25 for each user-selected field, which records the information in the second and third data structures 32 and 33. The output module 27 in the proxy cache 1 subsequently creates a log file 28 for the recorded field information. The log file 28 indicates the protocol and includes the logged fields in the user-selected order. Once logging has been completed, the log file 28 is saved to a non-volatile storage device, memory 29 in the proxy cache 1, and the second 32 and third 33 data structures are destroyed using a destroy operation of setup and destroy module 26.

Figure 3:
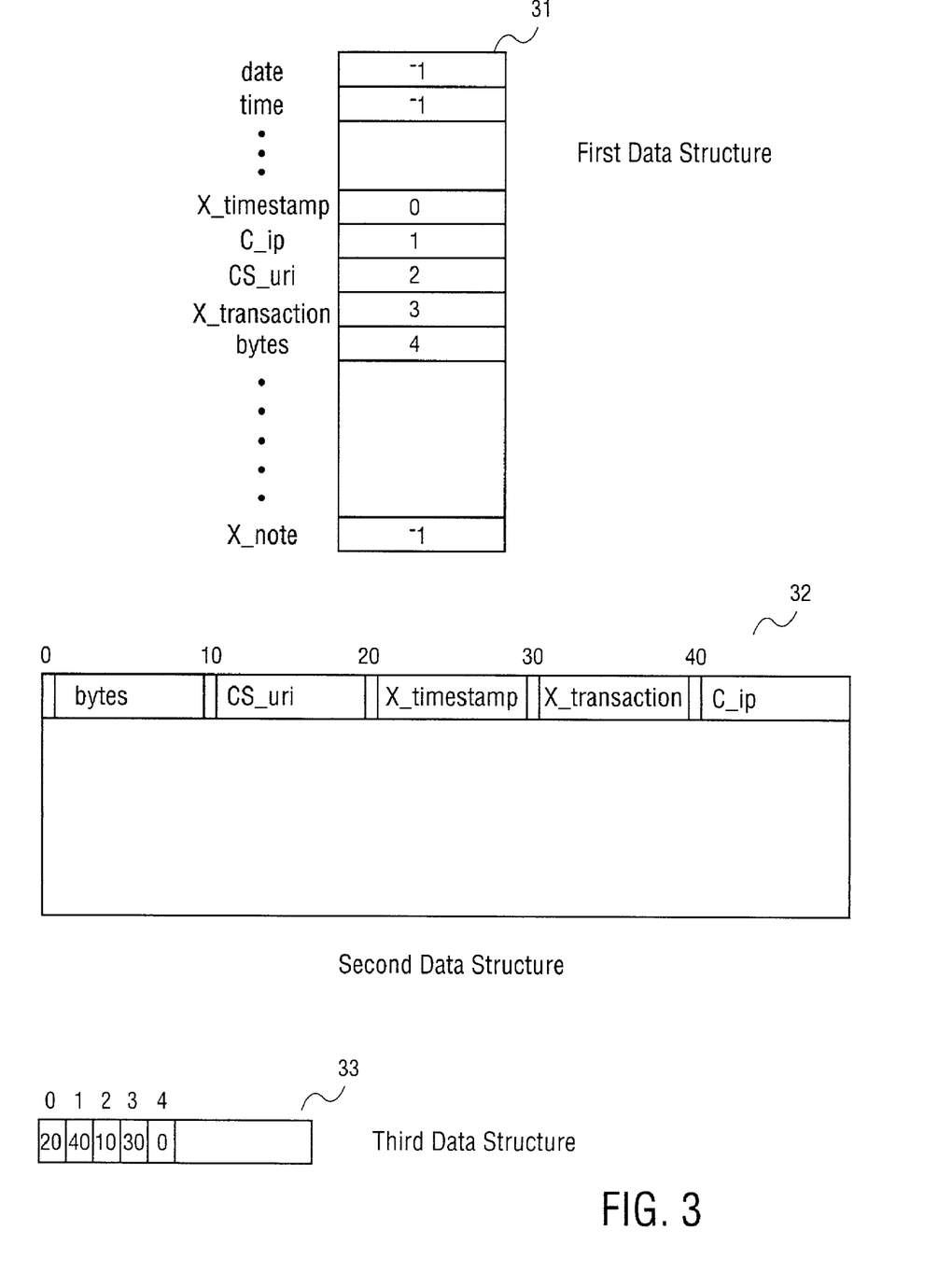
FIG. 3 illustrates a method by which data structures may be used within a logging system, according to one embodiment.

FIG. 3 shows an example of how to use data structures to implement the above described technique. A separate first data structure 31 is maintained in the proxy cache 1 for each protocol for which the proxy cache 1 supports logging. Hence, for each protocol, the corresponding first data structure 31 includes storage locations for all of the particular fields defined in that protocol. The first data structure 31 is initialized so that a predetermined flag (e.g., "−1") is placed in every location.

An administrator ("user") then utilizes the user interface 23 to select a protocol (e.g., HTTP, NNTP, or ICAP). The user then selects some or all of the fields defined within that protocol to be logged and the particular order in which the selected fields are to be logged. Once the fields and order are chosen by the user, the first data structure 31 for that protocol is modified so that the location, in the first data structure 31, of each field selected by the user for logging contains an integer value indicating the order in which the user wants that field to appear in the log file 28. The first data structure 31 in FIG. 3 is illustrated to show just a few of the possible fields associated with the HTTP protocol (e.g., "c_ip, cs_uri", etc.), as an example. This example is discussed further below.

Subsequently, in response to receiving a content request or a response, the application module 24 checks the first data structure 31 for each of the fields defined in the selected protocol to determine if the field has been selected for logging. If the user did not select that field, the application module 24 will see the predetermined flag (e.g., "−1") stored in the corresponding location of the first data structure 31 and, therefore, will not call the log module 25 to record that field; in that case, the application module 24 will go on to consider the next field defined in the protocol. If the user did select that field, however, the application module 24 will make a call to the log module 25, passing to it the integer value representing the user-specified order in which the field is to be logged, as stored in the first data structure 31. This action causes the log module 25 to obtain the information for that particular field from the request or response, record an ASCII representation of that information in the next available location of the second data structure 32 (note that formats other than ASCII may be used in alternative embodiments). The log module 25 also stores, in a location of the third data structure 33 corresponding to the user-selected order of that field, a reference to the field data stored in the second data structure 32. In one embodiment, the reference includes a position and length value of the ASCII field data in the second data structure 32.

Note that the second data structure 32 and third data structure 33 are created and destroyed on a transaction-by-transaction basis to avoid excessive memory usage. In contrast, the first data structure 31 persists between transactions.

Once all fields in the protocol have been either recorded (if present in the request or response) or ignored in response to a transaction, the output module 27 writes the field information recorded in the second data structure 32 to a log file 28 in the order the user selected. This is done by sequentially accessing consecutive locations of the third data structure 33 to retrieve the references stored therein, to locate the data in the second data structure 32 in the correct order.

Among other advantages, this technique allows new fields to be added and new protocols to be supported without any changes being made to the log module 25. Only the application module 24 has specific knowledge of the fields defined for each protocol. Neither the log module 25 nor the output module 27 requires any knowledge (independent of the data structures) of the fields defined for any protocol, the particular fields selected for logging, or the order in which particular fields should be logged. During a transaction, the log module 25 simply records fields in the order of the calls made to it (for each field) by the application module 24; this order is arbitrary and is at the discretion of the system designer. However, when recording fields in the second data structure 32, the log module 25 also records a reference to the location of each recorded field in a location of the third data structure 33 that matches the user-specified order of that field, based on the value from the first data structure 31 that it received in the call. The contents of the third data structure 33 allow the recorded fields to be written to the log file 28 in the correct order. The order in which calls are made to the log module 25 and in which fields are recorded is independent of the (user-specified) order in which the fields are written to, and appear in, the log file 28. Hence, new fields can be added and new protocols can be supported simply by updating the application module 24, without any changes being required to the logging module.

The customized logging technique can be described in terms of two phases. Phase one is during processing of a transaction where the application module 24 interacts with the log module 25 and each field is examined to see whether it has been selected for logging and, if it has, is copied into data the second structure (32) along with length and positional information. Phase two occurs at the end of a transaction, where the fields recorded in the second data structure 32 are written out in the correct order using the positional arguments stored in the third data structure 33.

Refer again to FIG. 3, which shows an example based on HTTP. Prior to set up by the user, the values in the first data structure 31 are initially all set to −1, which is the predetermined flag. However, after the user has selected the protocol, the fields to be logged, and the order in which they are to appear in the log file 28, the value of each location in the first data structure 31 represents the user-specified order in which that field is to appear in the log file 28. Hence, the contents of the first data structure 31 shown in FIG. 3 can be interpreted to mean that the user has specified fields "x-timestamp", "c-ip", "cs-uri", "x-transaction", and "bytes" to be logged for a request and to appear in that order in the log file 28. The flag values of −1 indicate that the fields "date", "time", and "x_note" are not to be logged. Note that the user-specified sequence of logging is not dependent on the order in which the sequence values are physically stored in the first data structure 31.

Assume now that at run time, the proxy cache 1 receives a request, such as "GET http://www.yahoo.com/foo.gif HTTP/1.0". In response to the request, the application module 24 calls the setup and destroy module 26 to initialize the second data structure 32 and the third data structure 33. The application module 24 then selects a field for which there is a value other than −1 stored in the first data structure 31, and then calls the log module 25, passing to the log module 25 the user-specified (integer) sequence value stored for that field in the first data structure 31.

In the illustrated example, the first field to be recorded is the "bytes" field. So, the application module 24 calls the log module 25, passing to it the user-specified sequence number for the "bytes" field from the first data structure 31, which in this case is "4" (indicating the fifth position in the log file 28, since the sequence values are 0, 1, 2, 3, 4, ... ). Accordingly, the log module 25 records the ASCII representation of the "bytes" field from the request starting from the first available byte of the second data structure 32, which in this case is byte 0. In conjunction with recording the "bytes" value in the second data structure 32, the log module 25 also records, in the third data structure 33, the position and length of the ASCII value as stored in the second data structure 32. The ASCII "bytes" value is specified to appear fifth in the sequence in the output log file 28. Consequently, the log module 25 also writes the position value "0" into the fifth position of the third data structure 33, as shown in FIG. 3. (The length of the ASCII string may also be stored at that location in the third data structure 33 but, to simplify explanation, is not shown in FIG. 3.)

Next, the application module 24 calls the log module 25, passing to it the user-specified sequence number for the "cs_uri" field from the first data structure 31, which in this case is "2" (indicating the third position in the log file 28). Accordingly, the log module 25 records the ASCII representation of the "cs_uri" field starting from the next available location of the second data structure 32, which in this example is byte 10 of the second data structure 32. Because "cs_uri" is specified to appear third in the log sequence, the log module 25 also records the position value "10" (and length value) in the third position of the third data structure 33, as shown in FIG. 3.

A similar process is carried out for the fields "x_timestemp", "x_transaction", and "c_ip", etc., in that order, until the transaction has been processed.

Next, phase two begins, in which the log module 25 examines the contents of the third data structure 33 sequentially, to write all of the fields recorded in the second data structure 32 to the log file 28 in the correct order.

Figure 4:
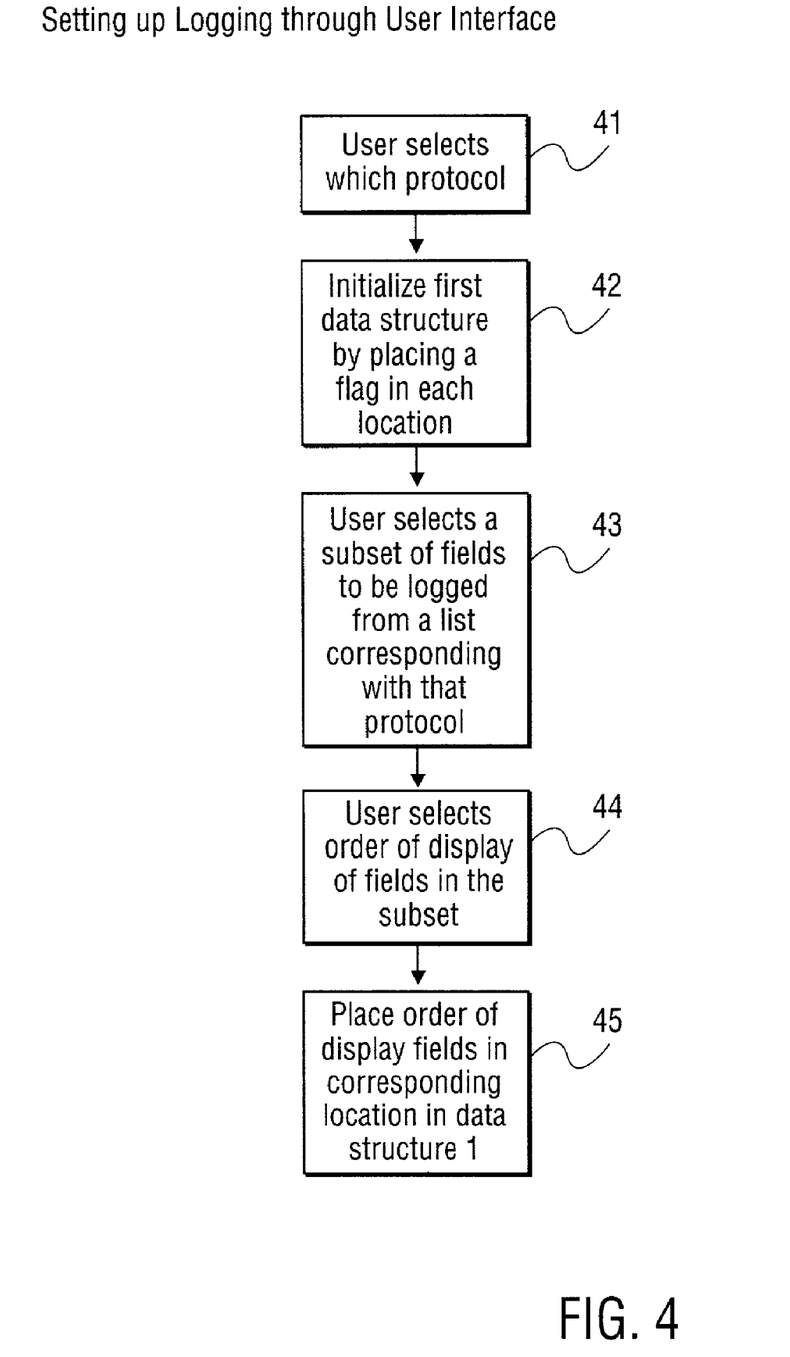
FIG. 4 is a flow diagram showing the process of setting up the proxy cache for logging requests, according to one embodiment.

FIG. 4 is a flowchart of an embodiment of the process used to set up logging through the user interface 23. First, at block 41 the user selects the protocol under which information will be logged. The first data structure 31 is initialized at block 42 by placing a predetermined flag (e.g., "−1") in each location. At block 43 the user then selects a subset of the fields available for logging under the selected protocol (the user can, of course, select all available fields). At block 44 the user selects the order of display in the log file 28, and at block 45 an integer value indicating the order of display of each selected field is placed in the location of the first data structure 31 corresponding with each selected field. Locations in the first data structure for fields that are not selected for logging remain set to the predetermined flag value.

Figure 5:
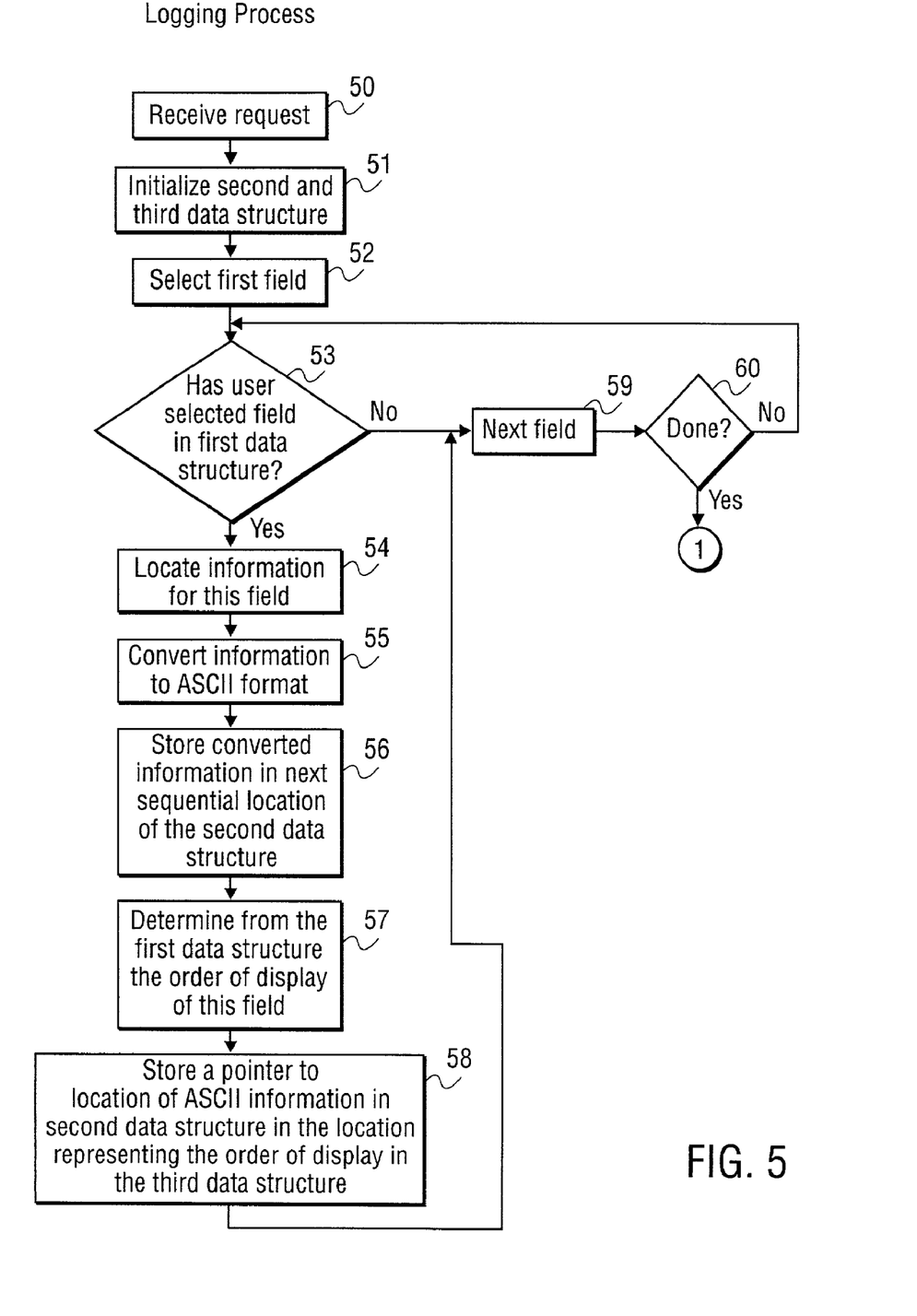
FIG. 5 is a flow diagram illustrating the recording process according to one embodiment.

FIG. 5 is a flowchart showing an embodiment of the recording process. The recording process is performed in response to each transaction (request or response). The application module receives a request (or response) at block 50. The second and third data structures 32 and 33 are initialized at block 51. The application module then selects a first field defined in the protocol at block 52. For the selected field, at block 53 the application module 24 checks the first data structure 31 to see if the user selected that field for logging. If the user did not select that field (i.e., the predetermined flag is found at the location for that field in the first data structure 31), the application module 24 will not read the value of that field from the request and will go on to the next field at block 59. If the user did select that field, the application module 24 passes the user-specified sequence value of that field from the first data structure 31 to the log module 25. The log module 25 then obtains the information for that particular field from the request at block 54, converts the information to ASCII format at block 55, records that information in the next available sequential location of the second data structure 32 at block 56, and determines (based on the integer value from the first data structure 31) the user-selected order for logging this field at block 57. At block 58 the log module 25 then stores, in a location of the third data structure 33 which corresponds to the selected order, a reference to the location where that field is recorded in the second data structure. This process is repeated during the transaction, per blocks 53, 59 and 60, until all fields defined in the protocol have been processed.

Figure 6:
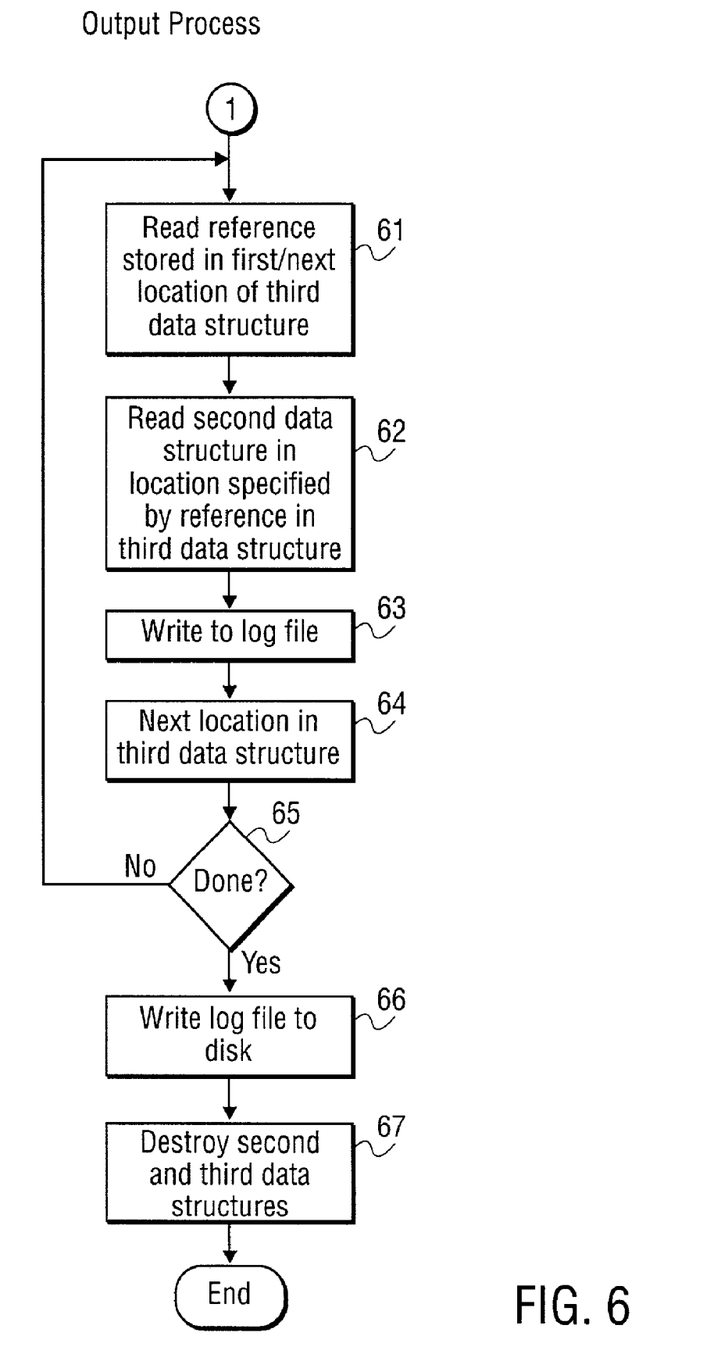
FIG. 6 is a flow diagram showing the process of outputting information to a log file, according to one embodiment.

FIG. 6 is a flowchart illustrating an embodiment of the output process of the invention. As with the recording process, the output process is also performed on a per transaction basis. Once the recording process shown in FIG. 5 is complete (i.e., the values of all fields have been either stored in the second data structure or ignored), the output module 27 reads the reference stored in the first location of the third data structure 33 at block 61 and then reads the value stored in the second data structure 32 in the location specified by the reference in the third data structure 33 at block 62. The information contained in the referenced location of the second data structure is then written to the log file 28 at block 63. The next sequential location of the third data structure 33 is read at block 64, and the above process continues until all locations of the third data structure 33 have been sequentially accessed, such that all of the user-selected fields have been written to the log file 28 in the user-specified order. When the process is finished (per block 65), the log file 28 is written to a non-volatile storage device 29 in the proxy cache 1, such as a disk drive, at block 66, and the second data structure 32 and third data structure 33 are destroyed at block 67.

Figure 7:
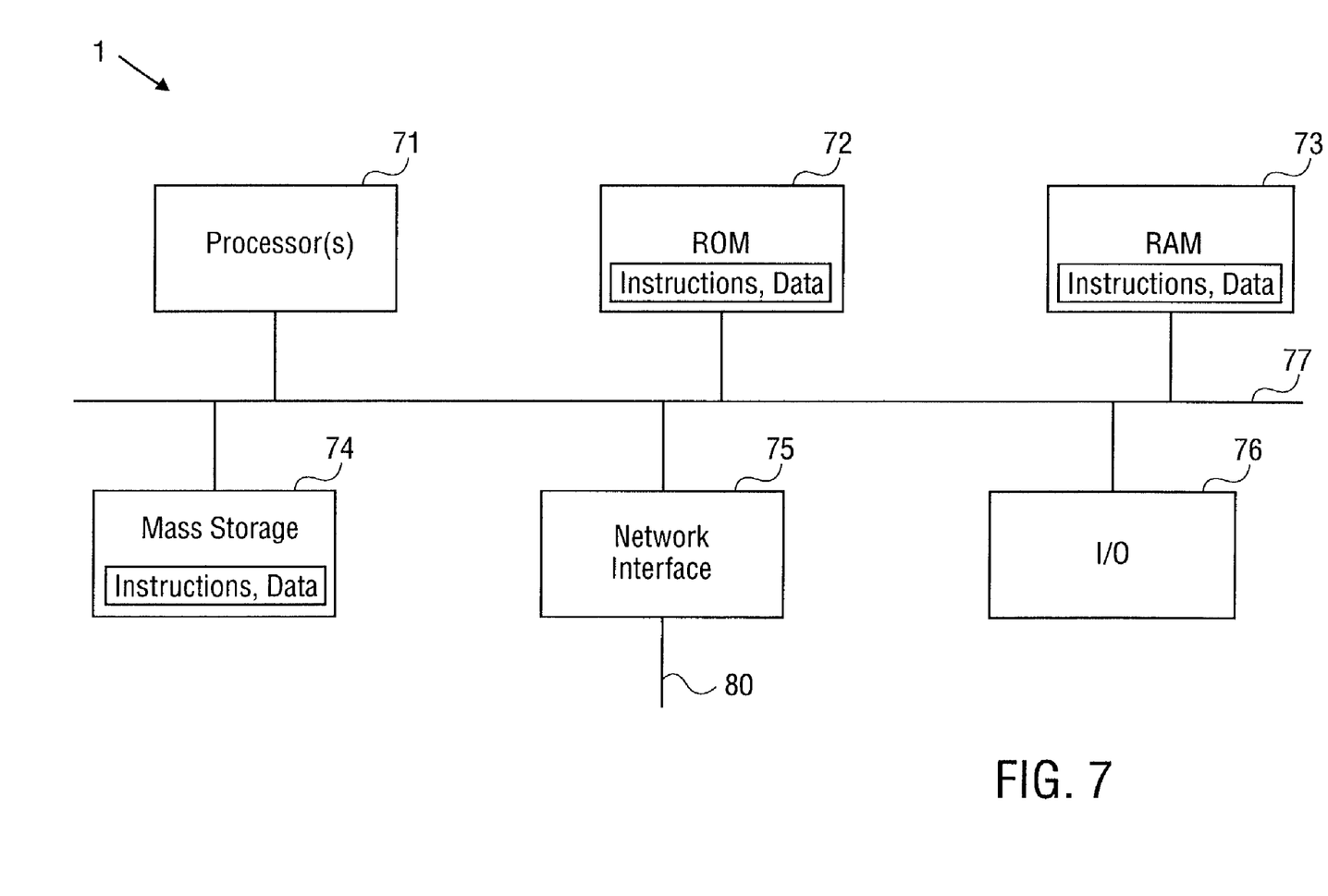
FIG. 7 is a block diagram showing an abstraction of the hardware components of the proxy cache, according to one embodiment.

FIG. 7 is a block diagram showing an abstraction of the hardware components of the proxy cache 1, according to one embodiment. Note that there are many possible implementations represented by this abstraction, which will be readily appreciated by those skilled in the art given this description.

The illustrated system includes one or more processors 71, i.e. a central processing unit (CPU), read-only memory (ROM) 72, and random access memory (RAM) 73, which may be coupled to each other by a bus system 77 and/or by direct connections. The processor(s) 71 may be, or may include, one or more programmable general-purpose or special-purpose microprocessors, digital signal processors (DSPs), programmable controllers, application specific integrated circuits (ASICs), programmable logic devices (PLDs), or a combination of such devices. The bus system (if any) 77 includes one or more buses or other connections, which may be connected to each other through various bridges, controllers and/or adapters, such as are well-known in the art. For example, the bus system 77 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 77 are one or more mass storage devices 74, a network interface 75, and one or more input/output (I/O) devices 76. Each mass storage device 74 may be, or may include, any one or more devices suitable for storing large volumes of data in a non-volatile manner, such as a magnetic disk or tape, magneto-optical (MO) storage device, or any of various forms of Digital Versatile Disk (DVD) or CD-ROM based storage, or a combination thereof. RAM 73 and/or the mass storage device(s) 74 may be used to implement the content cache 26 (FIG. 2).

The network interface 75 is one or more data communication devices suitable for enabling the processing system to communicate data with remote devices and systems via an external communication link 80. Each such data communication device may be, for example, an Ethernet adapter, a Digital Subscriber Line (DSL) modem, a cable modem, an Integrated Services Digital Network (ISDN) adapter, a satellite transceiver, or the like. Referring again to the embodiment of FIG. 1, the network interface 75 is used by the proxy cache 1 to communicate both over the LAN 2 and over the Internet 3. In particular, the network interface 75 is the communications interface by which the proxy cache 1 receives and communicates requests and responses between clients and servers. In addition, the network interface 75 may also be the communications interface by which a user adds, modifies, or deletes forwarding rules used by the proxy cache 1. Note that while only one external communication link 80 is illustrated, separate physical communication links may be provided for each network connection (e.g., to LAN 2, Internet 3), although that is not necessarily the case.

Since proxy cache 1 may be accessed by a user via network interface 75, proxy cache 1 does not necessarily require its own I/O devices 76. Nonetheless, such I/O devices may be included in some embodiments and may include, for example, a keyboard or keypad, a display device, and a pointing device (e.g., a mouse, trackball, or touchpad).

The above-described processes and techniques (e.g., request processing, customized logging, etc.) and the corresponding elements (FIG. 2) may be implemented at least partially in software. Such software may be part of the operating system of the proxy cache 1. Such software may reside, either entirely or in part, in any of RAM 73, mass storage device(s) 74 and/or ROM 72. Such software may be executed by the processor(s) 71 to carry out the described processes and techniques.

Thus, a method and apparatus for customized logging in a cache have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A device to log information in a network cache, the device comprising:
    a processor and a memory together providing,
        an application module to receive requests from a plurality of clients for content maintained by an origin server and to receive responses to the requests from the origin server;
        an interface to allow selection of a protocol, including a selection for logging of some or all of a plurality of fields of the protocol that may be present in each of said requests and responses, and a specification of a sequence in which the selected fields are to appear in a log file;
        a first data structure to store, for all of the plurality of fields of the protocol, an indication of whether a particular field has been selected for logging, wherein when the particular field has been selected for logging, the indication identifies a position in the specified sequence of the particular selected field;
        a second data structure to store information corresponding to each selected field;
        a third data structure to store, for each of the selected fields, a reference to the corresponding information stored in the second data structure, wherein each reference is stored in a location of the third data structure that corresponds to the position in the specified sequence of the selected field, and wherein the position is identified by the indication stored in the first data structure that corresponds to the selected field; and
        a log module to record information of the received requests and responses into the log file, according to the selected protocol, the selected fields of the protocol, and the specified sequence.

2. The device of claim 1, wherein the interface allows the creation of new fields in addition to the plurality of fields.

3. The device of claim 1, wherein the interface is a graphical user interface.

4. The device of claim 1, wherein the interface is a command line interface.

5. A method in a computing system of logging information in a network cache, the method comprising:
    by a processor of the computing system,
        receiving requests from a plurality of clients for content maintained by an origin server;
        receiving responses to said requests from the origin server;
        receiving inputs via an interface to make a selection for logging of some or all of a plurality of fields of a protocol that may be present in each of said requests and responses and to make a specification of a sequence in which the selected fields are to appear in a log file;

storing in a first data structure, for all of the selected fields, a value indicating whether a particular field has been selected for logging wherein when the particular field has been selected for logging, the value identifies a position in the specified sequence of the particular selected field;

in response to receiving each of the requests and responses, obtaining information for each selected field associated with the corresponding request or response and storing the information in a second data structure, in a sequence independent of the specified sequence, storing in a third data structure, for each selected field, a reference to the corresponding information stored in the second data structure, including storing, based on the first data structure, each reference in a location of the third data structure that corresponds to the position in the specified sequence of the selected field; and using the third data structure to output the information for each selected field in the second data structure to the log file, such that the information for each selected field appears in the log file according to the specified sequence.

6. The device of claim 1, wherein the interface further allows changing said selection to modify the log file's format while the network cache is running.

7. The method of claim 6, wherein the interface allows creation of new fields in addition to the plurality of fields.

8. The method of claim 6, wherein the information for each field is converted to an ASCII representation and is of variable length.

9. The method of claim 6, wherein each location in the first data structure is pre-initialized to contain a flag before the specified sequence is stored, the flag to be utilized as an indicator that the corresponding field particular was not selected for logging.

10. The method of claim 6, wherein the second data structure and the third data structure are created to respond to logging for the corresponding request or response and destroyed once logging for the corresponding requests or response is completed.

11. The method of claim 6, wherein the first data structure persists through logging for the requests and responses.

12. The method of claim 6, wherein using the third data structure to output the information further comprises sequentially accessing the third data structure to read the position of the information corresponding to each selected field and accessing the second data structure to read information corresponding to each selected field at the position indicated by the reference.

13. The method of claim 6, wherein the interface allows changing the selection and the sequence to modify the log file's format while the network cache is running.

14. A device for logging information in a network cache, the network cache serving a plurality of clients on behalf of an origin server, the device comprising:

a processor and a memory together providing, an interface to allow selection of a protocol, including a selection for logging of some or all of a plurality of fields of a message to be received from anyone of the origin server and the plurality of clients, the fields corresponding to the selected protocol, and a specification of a sequence in which the selected fields are to appear in a log file of the network cache, wherein the interface further allows changing said selections to modify the log file's format while the network cache is running;

a protocol specific application module to obtain information for each selected field associated with the message;

a first data structure to store, for all of the plurality of fields of the selected protocol, a value indicating whether a particular field has been selected, wherein when the particular field has been selected, the value identifies a position in the specified sequence of the particular selected field;

a second data structure to store the obtained information for each selected field;

a third data structure to store a reference to the information stored in the second data structure, including storing the reference in a location of the third data structure that corresponds to the position in the specified sequence of a field corresponding to the reference; and a protocol independent log module to receive information for each selected field from the protocol specific application module and to store the information for each selected field in the log file in the sequence specified.

15. The device of claim 14, wherein the interface allows creation of new fields in addition to the plurality of fields.

16. The device of claim 15, wherein the interface is a graphical user interface.

17. The device of claim 15, wherein the interface is a command line interface.

18. A method using one or more processors of a proxy device to operate a network cache, the method comprising:

by a processor of the proxy device, receiving requests from a plurality of clients for contents maintained by a server and responses to the requests from the server, wherein the requests and responses are formatted according to a protocol;

receiving a selection of a first number of fields from a plurality of fields of the protocol that may be present in each of the requests and responses, and receiving a specification of a first sequence in which the first number of fields are to appear in a log file of the network cache;

recording the first number of fields extracted from a first one of the requests and responses into the log file according to the first sequence, wherein the recording includes:

storing in a first data structure, for all of the plurality of fields of the protocol, a value indicating whether a particular field has been selected, wherein when the particular field has been selected, the value identifies a position in the first sequence of the particular selected field;

obtaining information of each of the first number of fields associated with the first one of the requests and responses and storing the information in a second data structure, in a sequence independent of the first sequence;

storing in a third data structure a reference to the information for each of the first number of fields stored in the second data structure, including storing each reference in a location of the third data structure that corresponds to the position in the first sequence of the field corresponding to the reference; and using the third data structure to output the information for each of the first number of fields in the second data structure to the log file, such that the information for each of the first number of fields appears in the log file according to the first sequence;

while operating the network cache, by a processor of the proxy device, receiving inputs that changes selection of the plurality of fields from the first number of fields to a second number of fields and specifies a second sequence; and recording the second number of fields extracted from a second one of the requests and responses into the log file according to the second sequence.

19. The method of claim 18, wherein recording the second number of fields extracted from the second one of the requests and responses into the log file according to the second sequence comprises:

by a processor of the proxy device, storing in the first data structure, for all of the plurality of fields of the protocol, a value indicating whether a particular field has been selected, wherein when the particular field has been selected, the value identifies the position in the second sequence of the particular selected field;

obtaining information of each of the second number of fields associated with the second one of the requests and responses and storing the information in the second data structure, in a sequence independent of the second sequence;

storing in the third data structure, based on the first data structure, a reference to the information for each of the second number of fields stored in the second data structure, including storing each reference in a location of the third data structure that corresponds to the position in the second sequence of the corresponding field; and using the third data structure to output the information for each of the second number of fields in the second data structure to the log file, such that the information for each of the second number of fields appears in the log file according to the second sequence.

\* \* \* \* \*